Patented May 15, 1945

2,375,753

UNITED STATES PATENT OFFICE 2,375,753

COATING COMPOSITION

Irwin C. Clare, Elmhurst, Del., assignor to Hercules Powder Company, Wilmington, Del., a corporation of Delaware No Drawing. Application November 26, 1942, Serial No. 467,049

13 Claims. (Cl. 106—173)

This invention relates to improved coating compositions and more particularly to improved coating compositions containing a new class of high-melting synthetic resins.

There has been a considerable demand for coating compositions of both the lacquer and varnish type which provide coatings of relatively high hardness and resistance to abrasion in a short time after application to surfaces such as wood and metal. In formulating lacquers and varnishes to provide such coatings, resins have been used which comprise modifications of rosin esters with polybasic acids such as maleic acid and anhydride and with phenolic resins. Such resins present difficulties when relatively high-melting point products are desired due to such factors as gelation and loss of the necessary compatibility in the higher melting ranges. Polymerization of rosin esters to provide higher melting esters for use in coating compositions has also been proposed. While by such a polymerization method it has been possible to obtain products of relatively high melting point, this has been attained at the expense of other characteristics such as the color. Also the polymerization catalysts undergo combination with unesterified hydroxyl groups of the rosin ester and thereby considerably reduce the effectiveness of the polymerization operation, producing by-products which contaminate the polymerized ester and which limit the melting point increase possible.

Now, in accordance with this invention, it has been found that improved coating compositions of both the lacquer and varnish type which are capable of giving films exhibiting a high degree of hardness and abrasion resistance in a short time after evaporation of the solvent may be produced. The improved coating compositions are obtained by utilizing a high-melting synthetic resin produced by heating a polyhydric alcohol and the polymeric distillation residue remaining after distillation of polymerized rosin under reduced pressure to remove the volatile unpolymerized rosin fraction and characterized by a drop melting point of at least about 160° C. The improved coating compositions may be prepared according to methods which are well known in the art for the various types of compositions. Thus, a spirit varnish may be prepared merely by dissolving the above-described synthetic resin in a suitable solvent. The improved lacquer may be prepared by dissolving the high-melting synthetic resin together with a cellulose derivative in a suitable solvent mixture. An oil varnish may be prepared by heating the high-melting synthetic resin with a drying oil and thinning with a suitable solvent.

Having thus indicated in a general way the nature of this invention, the following examples are cited to illustrate the improved coating compositions more specifically. In the examples the parts and percentages shown are by weight unless otherwise indicated.

Example 1

A polymerized rosin obtained by treatment of K wood rosin in benzene solution with 95% sulfuric acid as catalyst and having an acid number of 158, a drop melting point of 110° C., and a color of N was subjected to distillation at .5–1 mm. of mercury pressure. The temperature of the material being distilled was raised to a maximum of 270° C. From 509 parts of polymerized rosin after removal of the unpolymerized rosin and volatile matter, 260 parts of a distillation residue were obtained. This distillation residue had an acid number of 142, a color of N and a drop melting point of 176° C. Two hundred parts of this distillation residue were then heated with 21.5 parts of glycerol in a carbon dioxide atmosphere at a temperature of 270–280° C. for a period of 5½ hours, after which a vigorous stream of carbon dioxide was blown into the resin for 45 minutes, while maintaining the same temperature. The synthetic resin resulting had an acid number of 10.5, a Lovibond color of 80 Amber +2 Red, and a drop melting point of 204° C.

One hundred parts of this high-melting glycerol ester were heated with 94 parts of China-wood oil to 585° F. in 35–40 minutes, after which 22.5 parts of non-break soybean oil were added. The temperature of the mixture was then held at 485° F. for a period of 4 minutes, the mixture then cooled to 440° F. and thinned with a mixture of 21 parts of dipentene and 195 parts of mineral spirits having a boiling range of 300–400° F. The varnish so obtained had a Gardner-Holdt viscosity of C and a Hellige color of 5. Lead and cobalt driers were then incorporated in an amount to give .03% lead and .03% cobalt, based upon the total solids of the varnish. This varnish produced films characterized by a very short drying time, by high resistance to cold water, high resistance to alkalies, and high abrasion resistance.

A white enamel was prepared from the above varnish by grinding 125 parts of titanium dioxide pigment in 75 parts of the varnish base in a ball mill. The enamel paste obtained was reduced with additional varnish base so that the finished enamel contained 1 part of pigment to 1 part of varnish base. Driers were incorporated as in the clear varnish. The enamel so obtained gave films characterized by fast hard drying, good gloss and adhesion and good alkali resistance, making them suitable for application to surfaces such as concrete.

Example 2

A lacquer composition was prepared utilizing a synthetic resin prepared from the polymeric distillation residue described in Example 1 by esterification with ethylene glycol. A snythetic resin was prepared by heating 350 parts of the polymeric distillation residue with 25 parts of ethylene glycol in a nitrogen atmosphere and under a steam reflux condenser at a temperature of 230° C. for 3.5 hours, after which 12 parts of additional ethylene glycol were added and the temperature raised gradually to 285° C. The heating was continued at 285° C. until a test sample showed an acid number of 12. The reaction mixture was then subjected to a vigorous blowing of nitrogen for 45 minutes while maintaining the above temperature. The synthetic resin thereby obtained had an acid number of 7, a drop melting point of 177° C. and a color of H.

The lacquer was formulated by dissolving 10 parts of the above syntheic resin, 4 parts dibutyl phthalate and 8 parts of ½ second nitrocellulose in 84 parts of a solvent comprising 25% butyl acetate, 15% ethyl acetate, 5% ethyl alcohol, 5% butyl alcohol, and 50% toluene. The lacquer was characterized by providing films having excellent sanding properties, good abrasion resistance, good resistance to temperature change, and good gloss.

Example 3

The synthetic resin prepared from the polymeric distillation residue and glycerol as described in Example 1 is used in the preparation of a linseed oil varnish as follows: One hundred and fifty parts of the synthetic resin and 180 parts of heat bodied linseed oil of Z3 viscosity were heated in a nitrogen atmosphere to 565° F. in 40 minutes. The mixture was held at this temperature for 35 minutes and 1 part of lead acetate then stirred in. The mixture was then cooled and reduced to 50% solids by thinning with a blend of 90 parts mineral spirits and 10 parts dipentene. The varnish so obtained had a Gardner-Holdt viscosity of B and a Hellige color of 6. Incorporation of driers to give .07% cobalt based on the oil supplementing the .03% lead added as lead acetate gave a varnish which dried to dust in 2¾ hours and tack free in 4¾ hours. The varnish was highly desirable from the standpoint of improved alkali resistance, abrasion resistance and water resistance.

Example 4

A varnish was prepared utilizing the synthetic resin obtained from the polymeric distillation residue and glycerol as described in Example 1 in the following manner: One hundred and fifty parts of the synthetic resin and 60 parts of heat bodied linseed oil of Y viscosity were heated in a nitrogen atmosphere to 500° F. in 35 minutes and held at this temperature for about 5 minutes. Then 120 parts of fish oil dimer (solvent-extracted polymer of heat-bodied fish oil) and 80 parts of heat-bodied dehydrated castor oil of Z2 viscosity were added. The mixture was then heated to 565° F. in 20 minutes and held at this temperature for 30 minutes. At this point a medium pill was formed when a drop was cooled on glass. The varnish was then immediately chilled with 40 parts of Z2 dehydrated castor oil, 2 parts of lead acetate were added with stirring and the resulting varnish base was thinned to 50% solids with a solvent mixture comprising 90 parts of mineral spirits and 10 parts of dipentene. The varnish obtained had a Gardner-Holdt viscosity of B and a Hellige color of 5L. After incorporation of .07% cobalt based on the oil as a naphthenate drier solution, the varnish dried tack free in 6 hours giving a varnish film having good alkali resistance.

It will be seen from the above illustrative examples that by use of the high-melting synthetic resin obtained by the reaction of the polyhydric alcohol with the described polymeric distillation residue improved coating compositions of highly desirable characteristics are obtained. In producing the polymeric distillation residue utilized in forming the synthetic resins it may be obtained by distillation under reduced pressure of any polymerized rosin obtained by polymerization of rosin with any of the usual polymerization catalysts such as, for example, sulfuric acid, phosphoric acid, hydrogen fluoride, boron fluoride, metallic halides, as stannic chloride, zinc chloride, aluminum chloride, or by treatment with an acid sludge formed from rosin and sulfuric acid as described in U. S. Patent 2,288,659 to Tyler, or by treatment of rosin with a high voltage, high frequency electrical discharge. It will be appreciated that the polymerized rosin used may be the product resulting from polymerization of any grade of wood or gum rosin or the purified rosin acids contained in rosins such as abietic acid, pimaric acid, sapinic acid, etc.

The distillation procedure applied to the polymerized rosin to provide the distillation residue utilized in producing the synthetic resins which form the basis for the improved coating compositions requires the use of reduced pressure to avoid decomposition and decarboxylation of the polymerized rosin. Generally speaking, a pressure of less than about 100 mm. of mercury is desirable. Also, the lower the pressure used, the lower the temperature required in the distillation. A pressure below about 10 mm. will be preferred.

The polymeric distillation residue obtained from polymerized rosin utilized in preparing the new class of synthetic resins will be characterized by a drop melting point of at least about 160° C. and by an acid number from about 110 to about 180, depending upon the acid number of the original polymerized rosin or rosin acid used.

The polyhydric alcohol utilized may be any one or a mixture of the polyhydric alcohols which are stable at the reaction temperatures employed in preparing the synthetic resins and will include glycerol, pentaerythritol, dipentaerythritol, sorbitol, mannitol, glycols as ethylene glycol, diethylene glycol, triethylene glycol, propylene glycol, decamethylene glycol, as well as mixtures of any of the above.

In producing the synthetic resins by reaction of the polymeric distillation residue with the polyhydric alcohol, temperatures within the range of about 200° C. to about 325° C. and preferably from about 225° C. to about 290° C. will be employed. The actual reaction time required depends upon such factors as the preparation of polyhydric alcohol used, the reaction temperature, as well as the particular polyhydric alcohol.

Generally, a slight excess over the theoretical amount of polyhydric alcohol based on the acidity of the distillation residue will be employed to provide as complete a reaction as possible. Any excess polyhydric alcohol remaining after completion of the reaction may be removed in the usual manner as by blowing with an inert gas or by distillation under reduced pressure.

If desired, a fatty acid such as fatty acids obtained from glyceride oils may be included in the reaction mixture. When such fatty acids are used, the resulting synthetic resins will exhibit modified characteristics and for some purposes will be more desirable than the resin made without the modifying constituent. Acids such as linseed oil fatty acids, soybean oil fatty acids, perilla oil fatty acids, eleostearic acid, stearic acid, and oleic acid, will be found to be satisfactory for this purpose.

In preparing a spirit varnish in accordance with the invention, an alcohol is preferably employed as the solvent and the varnish will generally contain from about 25 to about 75% of solids. If desired, a spirit varnish may also contain a suitable plasticizer or softener such as castor oil, air blown castor oil, linseed oil, soybean oil, dibutyl phthalate, tricresyl phosphate, etc.

In preparing an oil varnish utilizing the polyhydric alcohol ester of the polymeric distillation residue described, any drying or semi-drying oil or the fatty acids contained therein may be employed. Thus, for example, linseed oil, dehydrated castor oil, China-wood oil, oiticica oil, perilla oil, fish oil, fish oil dimer, sunflower seed oil, soybean oil, hemp seed oil, rape seed oil, walnut oil, etc., may be used. Generally speaking, a desirable oil length in the varnishes will be from about 5 to about 100 gallons per 100 lbs. of synthetic resin, and preferably from about 7½ to about 55 gallons. The cooking temperature may be from about 300 to about 650° F. and preferably from 485° to 590° F., or more preferably 560° to 590° F.

In preparing the oil varnishes it will be found that a much shorter cooking time may be used than when the prior art rosin esters are employed. However, the particular drying time required in any specific formulation will depend on a number of factors as will be obvious to those skilled in the art.

As driers in the oil varnishes, cobalt, zinc, manganese, or lead may be incorporated in the form of soluble driers or by incorporation as a reactive salt in the preparation of the varnish. The varnishes may be pigmented with such pigments as basic lead carbonate, zinc oxide, titanium dioxide, lithopone, chrome yellow, Para Toner, Prussian blue, carbon black, etc., to provide enamel compositions exhibiting fast drying characteristics and the other improved characteristics described in connection with the varnishes.

The improved lacquer compositions in accordance with the invention may be formulated with use of cellulose esters or cellulose ethers such as, for example, nitrocellulose, cellulose acetate, cellulose acetobutyrate, ethyl cellulose, etc. In general, the lacquer compositions will contain from about 20% to about 75% of the cellulose derivative. Softeners, plasticizers and pigments may be incorporated in accordance with procedures well known in the art.

The improved coating compositions which have been described in accordance with this invention fulfill a definite need which has existed in the art. Thus, they provide hard durable films with short drying times which exhibit a high resistance to abrasion. The varnishes are particularly valuable since they exhibit fast bodying characteristics in the preparation and dry to provide films of improved water and alkali resistance as well as the improved abrasion resistance. The lacquers are particularly valuable for application to furniture due to their excellent sanding and polishing properties and their excellent resistance to abrasion.

What I claim and desire to protect by Letters Patent is:

1. A coating composition comprising a solvent and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

2. A coating composition comprising a solvent, a drying oil and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

3. A coating composition comprising a solvent, a cellulose derivative selected from the group consisting of cellulose ethers and esters and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

4. A coating composition comprising a solvent and a high-melting synthetic resin produced by the reaction of glycerol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

5. A coating composition comprising a solvent and a high-melting synthetic resin produced by the reaction of pentaerythritol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

6. A coating composition comprising a solvent and a high-melting synthetic resin produced by the reaction of a glycol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

7. A coating composition comprising a solvent, a drying oil and a high-melting synthetic resin produced by the reaction of glycerol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

8. A coating composition comprising a solvent, a cellulose derivative selected from the group consisting of cellulose ethers and esters and a high-melting synthetic resin produced by the reaction of glycerol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

9. A coating composition comprising a solvent, linseed oil and a high-melting synthetic resin produced by the reaction of glycerol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

10. A coating composition comprising a solvent, a drying oil, a drier, and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

11. A coating composition comprising a solvent, a drying oil, a drier, a pigment, and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

12. A coating composition comprising a solvent, nitrocellulose and a high-melting synthetic resin produced by the reaction of a polyhydric alcohol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

13. A coating composition comprising a solvent, nitrocellulose and a high-melting synthetic resin produced by the reaction of glycerol and a polymeric distillation residue remaining after distillation of polymerized rosin under reduced pressure to remove the volatile unpolymerized rosin fraction, said polymeric distillation residue consisting essentially of the dimer of rosin and being characterized by a drop melting point of at least about 160° C.

IRWIN C. CLARE.